United States Patent
Skiba et al.

(10) Patent No.: US 9,635,175 B2
(45) Date of Patent: Apr. 25, 2017

(54) AGGREGATED MULTI-TOPIC AGENT DESKTOP

(71) Applicant: Avaya Inc., Basking Ridge, NJ (US)

(72) Inventors: David Skiba, Golden, CO (US);
George Erhart, Loveland, CO (US);
Lee Becker, Boulder, CO (US);
Valentine C. Matula, Granville, OH (US)

(73) Assignee: Avaya Inc., Basking Ridge, NJ (US)

(*) Notice: Subject to any disclaimer, the term of this patent is extended or adjusted under 35 U.S.C. 154(b) by 69 days.

(21) Appl. No.: 14/084,501

(22) Filed: Nov. 19, 2013

(65) Prior Publication Data
US 2015/0139415 A1    May 21, 2015

(51) Int. Cl.
*H04M 3/00* (2006.01)
*H04M 3/51* (2006.01)
*H04M 3/42* (2006.01)

(52) U.S. Cl.
CPC ..... *H04M 3/5133* (2013.01); *H04M 3/42382* (2013.01); *H04M 2203/551* (2013.01)

(58) Field of Classification Search
CPC .. H04M 3/5175; H04M 3/523; H04M 3/5191; H04M 3/5183; H04M 3/5166
USPC .......... 379/265.01–265.02, 265.09
See application file for complete search history.

(56) References Cited

U.S. PATENT DOCUMENTS

| | | | |
|---|---|---|---|
| 2013/0007037 A1 | 1/2013 | Azzam et al. | |
| 2013/0197967 A1* | 8/2013 | Pinto | G06Q 10/0637 705/7.28 |
| 2013/0198204 A1* | 8/2013 | Williams | G06F 17/30283 707/748 |
| 2013/0282594 A1* | 10/2013 | Gaedcke et al. | 705/304 |

* cited by examiner

*Primary Examiner* — Rasha Al Aubidi
(74) *Attorney, Agent, or Firm* — Sheridan Ross P.C.

(57) ABSTRACT

A dialog aggregator provided by a contact center communication system for text-based interaction chains is described along with various methods and mechanisms for administering the same. The dialog aggregator produces a summary, in real-time, of questions posed and existing answers in the interaction chain while identifying outstanding questions that have not been answered for display to an agent. The display includes any current answer the agent is working on as well as completed items and additionally executes rules based on the status of the remaining questions. The display in canonical form of the summary and outstanding question set enables a contact center agent or other observer of the interaction to quickly and efficiently assess the interaction history.

20 Claims, 5 Drawing Sheets

204

Customer 1
I Love AC stuff!! BUT on 3 seperate occasions now I have gone to buy things and ended up not because the delivery dates are stupid!!! Every other high street shop can get items to you next day or a week tops. yours are like 2-3 weeks for some items!!!!! Ive just spent over an hour picking clothes for my 3 children, get to the check out and told i will be waiting until 19th April!! I wont be ordering them, thats no good for me. Sort it out AC!!!

Acme Clothier
We are sorry to hear that we have disappointed you. We allow our customers to reserve items when we know that our suppliers are sending us a new shipment of them. We appreciate your understanding in this matter.

Customer 1
Then surely it would better to show this on the stock when your looking at them rather than finding out at the end when you go to checkout!

Customer 2
I had the same problem! It's so annoying that I don't order from them any more.

Acme Clothier
You are able to see the availability dates at any time by viewing your shopping basket. Please be assured that we will pass along your feedback to the relevant department. Thank you for your comments, without them we would be unable to improve our service.

Customer 1
So im placing an order of around 15 items and I have to go to the shopping basket after each item It took me over an hour to pick without doing that!! thats still rubbish lol. I have only tried to order from AC online 4 times over the past year and 3 of those times ive not ordered because of this. How can such a huge company have such little stock available?

FIG. 2A

- The initial customer statements indicate unhappiness with the delivery dates provided when ordering on-line.
- The agent response does not answer this at all.
- The customer responds again that they should show the dates on the catalog page
- A second customer complains.
- The agent finally responds to the first customer's actual issue but not to the second customer's complaint.
- The customer complains about the stocking levels.
- No response by the company.

FIG. 2B

AGGREGATED MULTI-TOPIC AGENT DESKTOP

FIELD OF THE DISCLOSURE

The present disclosure is generally directed toward communications and more specifically toward contact centers.

BACKGROUND

Contact centers manage customer interactions between businesses and customers. Historically, the customer interactions were handled by telephone for the customer by a human agent. A current trend in customer service is to use and push customers towards other forms of customer service interactions. The other forms of interactions don't necessarily require human agent involvement. Using these other forms of interactions saves time and reserves resources for customers who do need the human agent to complete a transaction.

Social media and email channel interactions are increasingly being used for technical support, answering questions, and providing information. With these two channels, customers often ask one or more questions on one or many topics and carry on multi-turn dialogs within the framework of a single interaction or dialog. Sometimes the multi-turn dialogs span multiple channels, like a social media public post, a social media direct message, an email, and/or an instant messaging session. With multiple questions, multiple answers, multiple channels, and multiple parties involved, determining when the interaction is over and which items remain unresolved becomes important and may be complicated and time-consuming for a contact center agent.

Contact center agents typically manage these interactions and dialogs. Agents who respond to written forms of complex problems are highly skilled, expensive, and are in high demand with limited availability. A significant amount of agent time is required to determine which items and sub-items have been addressed and which ones have yet to be resolved. The problem gets even more complex as the email channel iterations increase and the comments increase on social media.

SUMMARY

These and other needs are addressed by the various aspects, embodiments, and/or configurations of the present disclosure. The present disclosure is directed to a dialog aggregator for text-based interaction chains that produces a summary, in real-time, of questions posed and existing answers in the interaction chain while identifying outstanding questions that have not been answered. The summary and outstanding questions set, in some embodiments, enables a contact center agent or other observer of the interaction to quickly and efficiently assess the interaction history presented in canonical form, including items that are still outstanding. The display in canonical form includes any current answer the agent is working on as well as items that have been completed for the interaction and additionally executes rules based on the status of the remaining questions.

In some embodiments, the dialog aggregator can analyze a complete interaction chain of incoming items (i.e., email content history, post/comment/direct message, etc). The analysis can determine all questions through text processing topic analysis and/or other methods. After the first analysis completes, the dialog aggregator can search for all possible answers to the questions. The questions and answers may be paired and converted into canonical form so that answers can be provided automatically and/or manually to the customer for available pairs. Questions without answers can be identified and assigned to the human agent for efficient handling.

The dialog aggregator disclosed is a discourse interpretation, which is more than sophisticated rephrasing or auto-answering. The method can include decomposing information from a discourse into a better and more usable form before sending the questions to the agent. This does not take the form of a summary. Rather, it arranges the information into an aggregated canonical form that communicates the raw information from the customer to the agent. For a badly formed ambiguous question, the system can fill in the blanks, including tying the question to customer data from previous interactions before it gets to the agent. A workflow is built to enable one or more persons (e.g., agents, supervisors) and/or the system to answer the questions (e.g., email content history/post/comment/direct message) from a social media or email chain either serially or in parallel. The stream may automatically be reviewed before the answers are sent out (e.g., billing, delivery, FAQ, etc.) to determine that all questions have been answered.

In some embodiments, an agent display can provide a canonical aggregation of questions, answers, and updates. Each question that has an answer can be displayed with the appropriate answer from the interaction chain. The display may reside in an easy to access side pane within an agent's desktop and/or on a user interface on a communication device. The remaining questions requiring answers may be highlighted for the agent to easily determine which items need to be resolved.

While the agent is working on one specific question or a full complement of questions and answers, the dialog aggregator may additionally evaluate the agent input in real time. When answered, the questions can move to an answered indication or may be highlighted differently. This provides the agent and/or supervisor a visual indication of completeness while typing in responses. This allows the agent or agents and the supervisor to see when all questions have answers and the question and answer set can be sent to the customer.

In a non-limiting example, there may be a tweet: "I was on the flight from Boston to Newark, N.J. this morning, and was downgraded from first class, even though I used a certificate." The system can organize the information into canonical form:

Flight UA 291 BOS-EWR 25-APR-13 Issue: Upgrade issue

The dialog aggregator can detect one flight and pair it with the time of the tweet, and based on that information can identify the flight. Alternatively, it can have given two or more flight options, if applicable. By putting the data into canonical form, the system helps speed the agent response as he or she won't have to search for nor interpret a story from raw data since the information is delivered in a form that is easy to understand and use with standard agent desktop applications.

Canonical form can extend across multiple tweets, capturing an open issue where no one tweet has the whole issue:
"Flew from Boston to Newark today, and they messed up my seat"
"Flew out this morning"
"Downgraded me, dammit"
"I want my certificate back!"

Canonical form: Flight UA 291 BOS-EWR 25-APR-13
Issue: Upgrade issue

Variations on the agent display to show the original stream and highlight where the answers are in the original stream can also be implemented. The variations may increase agent efficiency, especially as the volume of posts or email turns grows.

In an additional embodiment, locks may be put into place to keep agents from responding with incomplete answers and/or off-topic answers. A further innovation is to require supervisor review and/or approval when an agent responds with a correct answer, a correct set of answers, an incomplete answer, an incomplete set of answers, an incorrect answer, and an incorrect set of answers.

These and other advantages will be apparent from the disclosure.

In some embodiments, a method is provided that generally comprises:

receiving a multi-topic dialog;

analyzing the multi-topic dialog to identify questions contained within the multi-topic dialog;

formatting a presentation of the multi-topic dialog, the presentation including an identification of at least some of the questions contained within the multi-topic dialog;

determining whether each question in the identified questions has been addressed;

presenting the presentation of the multi-topic dialog, wherein the presentation of the multi-topic dialog includes the identified questions along with corresponding indications of whether or not the identified questions have been answered; and wherein determining whether each question in the identified questions has been addressed comprises analyzing social media interactions, email interactions, and chat interactions to determine if a question has been addressed by someone other than a contact center agent.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The phrase "multi-topic" may include one or multiple questions, statements, and/or answers covering one or more problems from one or more participants. There may also be one or more topics in a single multi-topic dialog.

The term "customer" or "client" denotes a party patronizing, serviced by, or otherwise doing business with a contact center, business, or enterprise.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 2A is an example of a dialog between customers and a company in accordance with embodiments of the present disclosure;

FIG. 2B is a list of comments and questions from the dialog in FIG. 2A in accordance with embodiments of the present disclosure;

DETAILED DESCRIPTION

Figure 1:
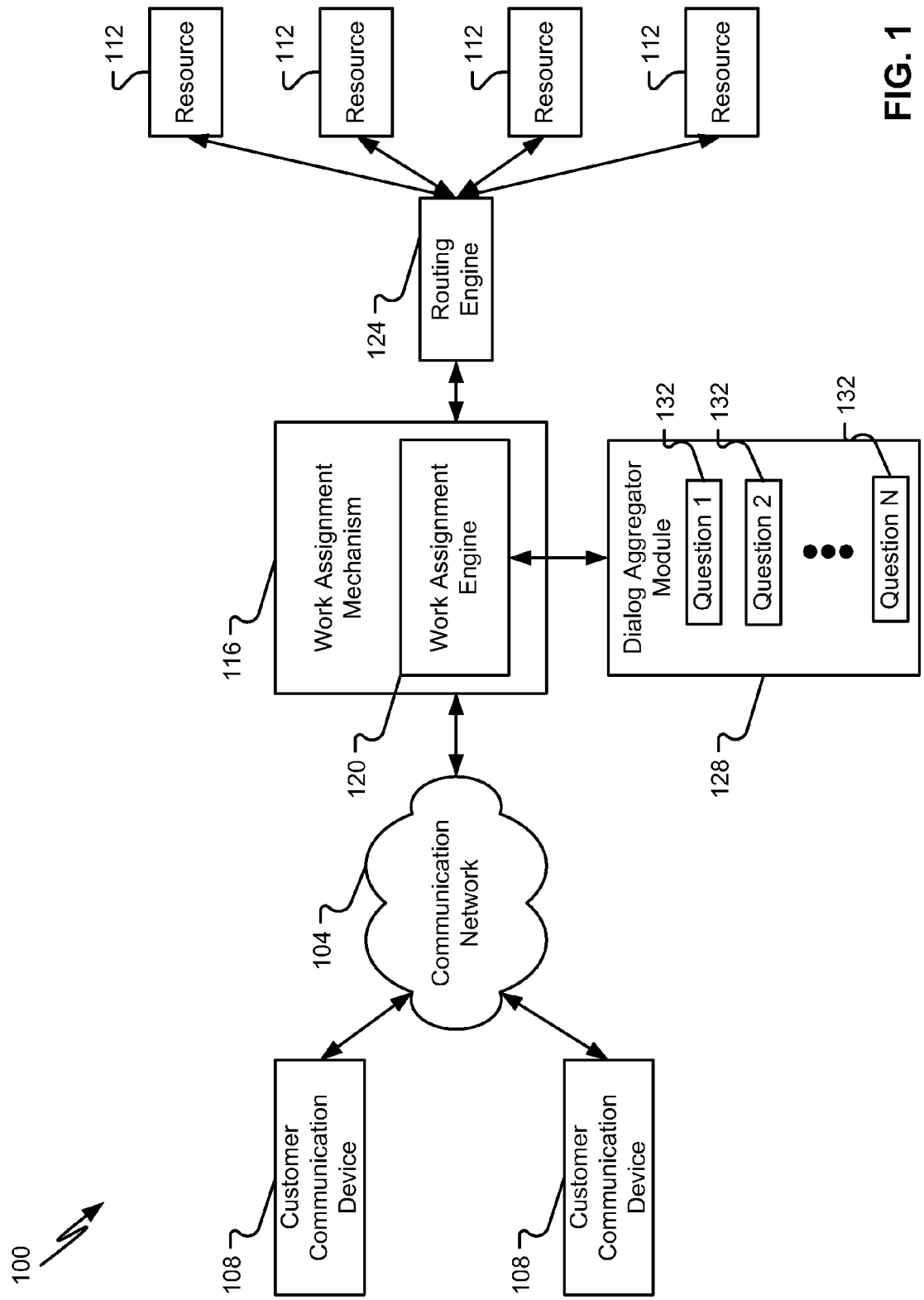
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Publication Nos. 2010/0235218, 2011/0125826, and 2011/0125793, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item can be sent toward a collection of processing resources 112 via the combined efforts of the work assignment mechanism 116 and routing engine 124. The resources 112 can either be completely automated resources (e.g., Interactive Voice Response (IVR)

units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 may be configured to administer and make work assignment decisions in a queueless contact center, as is described in U.S. Patent Publication No. 2011/0255683, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 can be configured to achieve true one-to-one matching by utilizing bitmaps/tables and other data structures.

In accordance with at least some embodiments of the present disclosure, a dialog aggregator module 128 comprises a web-based user interface that provides the resource 112 with an aggregation of dialog information in canonical format for assisting customers. More specifically, the dialog aggregator module 128 can evaluate one or more topics and/or questions 132 received from the communication network 104 from a customer communication device 108, recognize questions 132, and determine if answers exist to the questions 132. Information provided by the dialog aggregator module 128 can be used by the work assignment engine 120 to route work items, automatically answer questions 132, assist resources 112, and provide displays based on text analysis and historical interaction information as the questions 132 are analyzed, aggregated, and converted into canonical form. Additionally, the dialog aggregator module 128 can provide a locking mechanism for unanswered questions 132. The dialog aggregator module 128 may optionally provide screening to determine if the questions 132 have been answered correctly and notification to the resource 112 and/or supervisor if the questions 132 have not been answered correctly and/or require review before they are released to the customer.

FIG. 2A is an example of a dialog 204 between a customer and a company in accordance with at least some embodiments of the present disclosure.

In a non-limiting example, a question 132 from a customer to a company may include several details regarding a situation or interaction on a social media site. The dialog aggregator module 128 is operable to manage all incoming questions 132.

Customer 1
I Love AC stuff!! BUT on 3 separate occasions now I have gone to buy things and ended up not because the delivery dates are stupid!!! Every other high street shop can get items to you next day or a week tops. yours are like 2-3 weeks for some items!!!!! Ive just spent over an hour picking clothes for my 3 children, get to the check out and told i will be waiting until 19th April!! I wont be ordering them, thats no good for me. Sort it out AC!!!

Acme Clothier
We are sorry to hear that we have disappointed you. We allow our customers to reserve items when we know that our suppliers are sending us a new shipment of them. We appreciate your understanding in this matter.

Customer 1
Then surely it would better to show this on the stock when your looking at them rather than finding out at the end when you go to checkout!

Customer 2
I had the same problem! It's so annoying that I don't order from them any more.

Acme Clothier
You are able to see the availability dates at any time by viewing your shopping basket. Please be assured that we will pass along your feedback to the relevant department. Thank you for your comments, without them we would be unable to improve our service.

Customer 1
So im placing an order of around 15 items and I have to go to the shopping basket after each item It took me over an hour to pick without doing that!! thats still rubbish lol. I have only tried to order from AC online 4 times over the past year and 3 of those times ive not ordered because of this. How can such a huge company have such little stock available?

As illustrated in the example, one or more customers may have questions 132 and/or comments that provide opportunities for the company to answer, correct, and otherwise address outstanding issues.

FIG. 2B is a list 208 of comments and questions from the dialog 204 in FIG. 2A in accordance with embodiments of the present disclosure. A first analysis provides an overview from a customer's text communication outlining all of the issues and responses in the dialog.

The initial customer statements indicate unhappiness with the delivery dates provided when ordering on-line.

The agent response does not answer this at all.

The customer responds again that they should show dates on the catalog page.

A second customer complains.

The agent responds to the customer's issue.

The customer complains about the stocking levels.

No response by the company.

A display may be created including a list of items that are completed and items that still need to be addressed. The list will be analyzed and processed including historical information and related posts, tweets, and additional related data. The list will be presented in canonical format to a contact center agent, which will be discussed in detail in FIG. 3.

Figure 3:
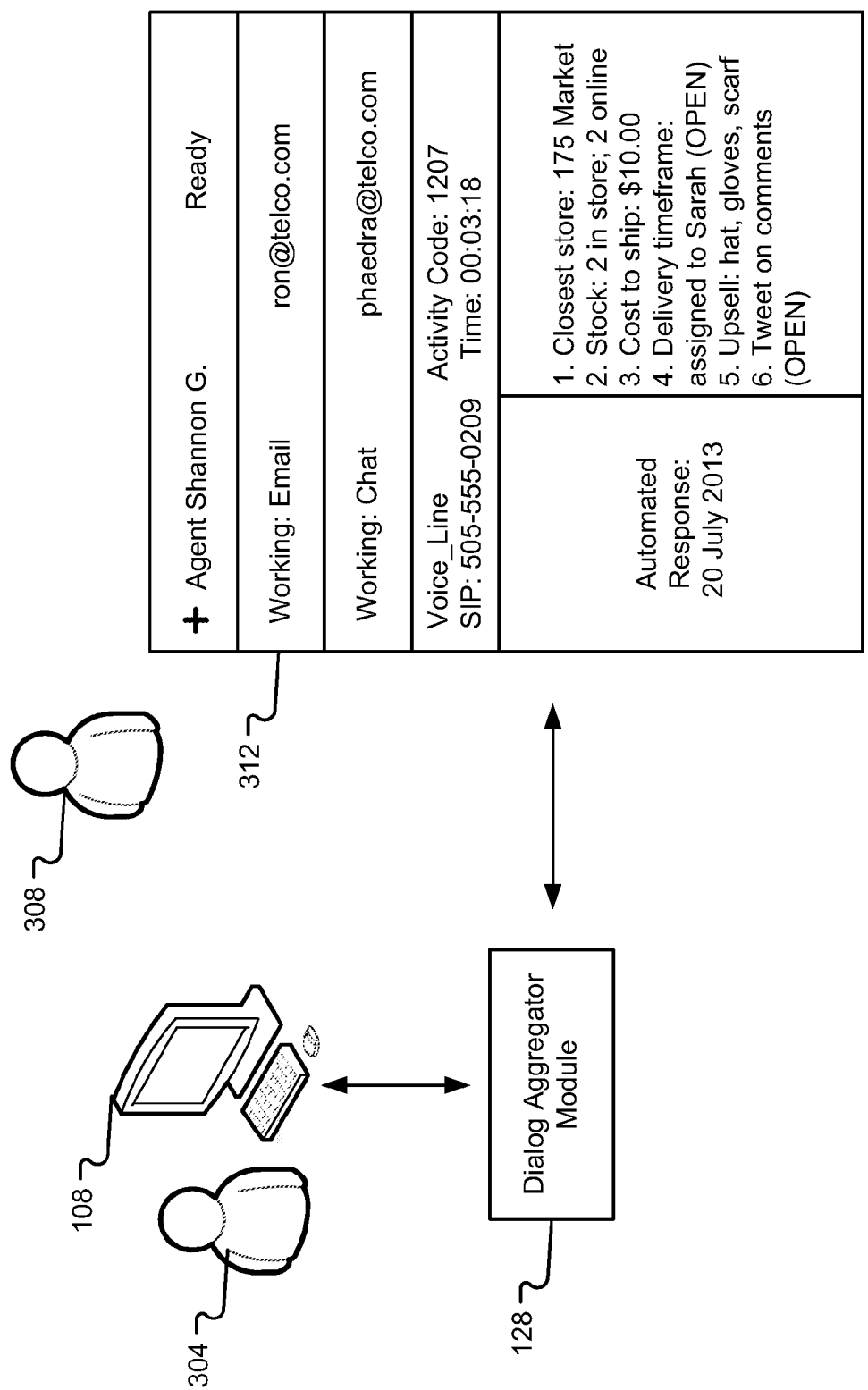
FIG. 3 is an example of an agent user interface with canonical display in accordance with embodiments of the present disclosure.

FIG. 3 is an example of an agent user interface in accordance with embodiments of the present disclosure. The agent user interface 312 may communicate with, in some embodiments, a customer 304 at a customer communication device 108 connected via the Internet to a communication system 100 that includes a dialog aggregator module 128, which may be owned and operated by an enterprise administering a contact center in which the communication system 100 is operable to handle incoming requests and queries from a customer communication device 108.

In a non-limiting example, a customer Ron 304 may have questions for a company about a jacket. The customer Ron 304 may choose to check a web site through a customer communication device 108 connected to the Internet to a communication system 100. Agent Shannon G. 308 is ready and available to take a work item, indicated by a "+" on the agent display 312. The session begins with an email request from the customer Ron 304. At the same time, the routing engine 124 may assign agent Shannon G. 308 a chat message from Phaedra, an outside call, and any number of related and/or non-related questions about clothing that is on sale.

The customer Ron 304 poses several questions in his email, including "What store is closest to me?" "Do they have the jacket in stock?" "How expensive is it to ship it to arrive in three days?" At the same time, additional customers including Phaedra and the customer on the voice call may ask about delivery options.

The dialog aggregator module 128 may perform an analysis of email, chat, and other channels coming in to agent Shannon G. 308. When there are multiple queries about the jacket, the dialog aggregator module 128 can present the information and/or answers to the agent Shannon G. 308 on the agent display 312. The first question is where is the closest store to me? The answer may be displayed:

Closest store: 175 Market

The second question is how many are available? The answer may be displayed:

Stock: two available in store and online

The third question is how much is the shipping? The answer may be displayed:

Cost to ship: $10.00

The fourth question is how long before it arrives? The answer may be displayed as a highlighted item or an OPEN item if it is not yet completed along with an assignment if assigned to someone other than agent Shannon G. 308:

Delivery timeframe—assigned to Sarah (OPEN)

The fifth portion of the display includes instructions for the agent, and may be displayed:

Upsell: hat, gloves, scarf

The sixth portion of the display includes instructions for the agent, and may be displayed:

Tweet on comments (OPEN)

Additionally, a portion of the history may be displayed in regards to the last interaction with the communication system 200, and may be displayed as:

Automated Response: 20 Jul. 2013.

The agent display 312 is specifically designed to highlight the results of the analyses of the dialog aggregator module 128 to improve agent response time and customer satisfaction.

Figure 4:
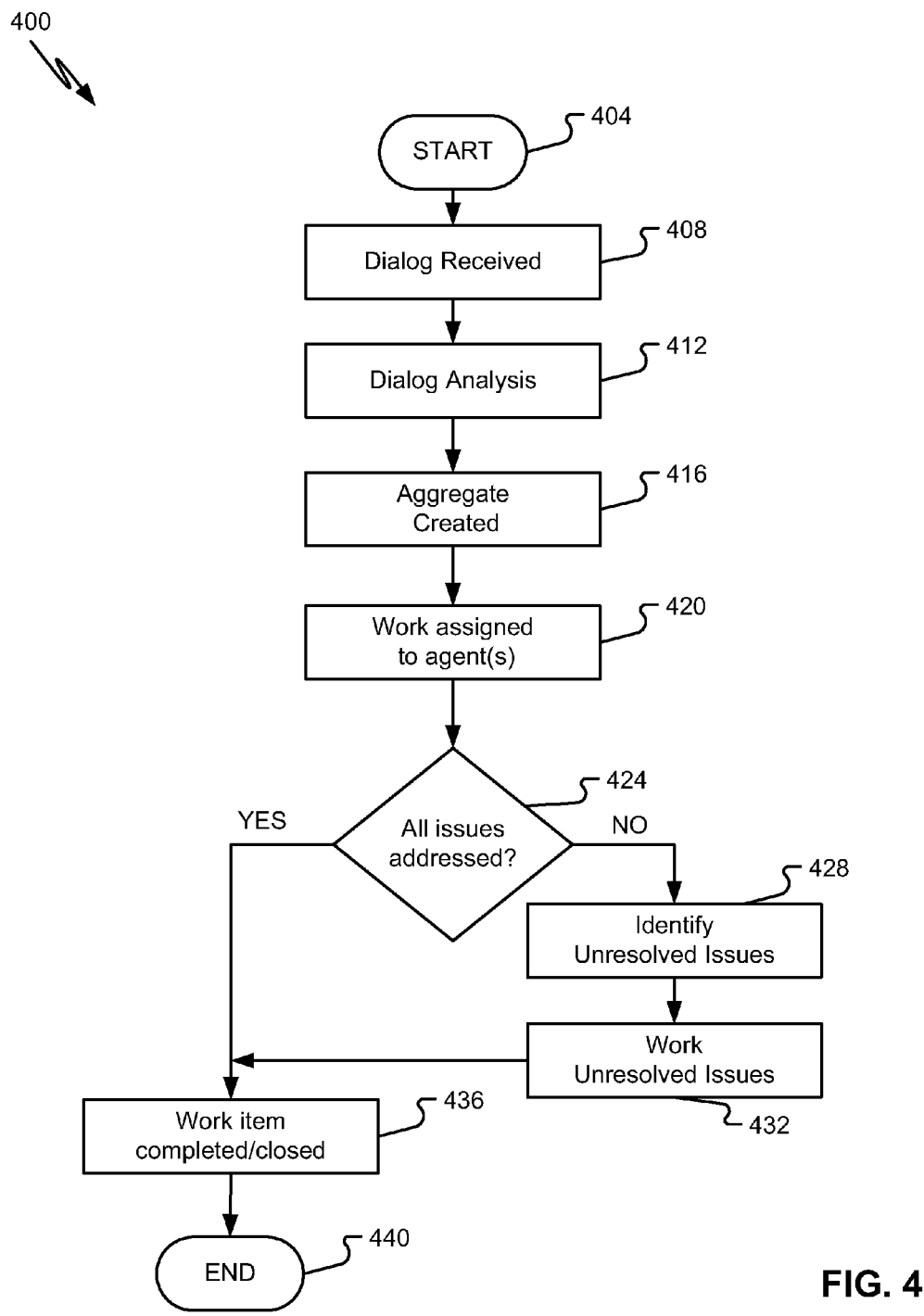
FIG. 4 is a flow diagram for dialog analysis and presentation in accordance with embodiments of the present disclosure.

With reference now to FIG. 4, aspects of a method 400 for dialog analysis and presentation in accordance with embodiments of the present disclosure are depicted. Generally, the method 400 begins with a start operation 404 and terminates with an end operation 440. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, structures, etc. described in conjunction with FIGS. 1-3.

The method begins at step 404 and continues when a contact center receives a dialog with at least one question 132 (step 408). The communication system 100 can accept the dialog with at least one question 132. In step 412, the dialog aggregator module 128 may begin a topic, question, statement, comment, and work item analysis. Once the questions 132 of the dialog have been established, the dialog aggregator module 128 may determine if an answer to a question 132 presented in the dialog is available. In step 416, the questions 132 are simplified into canonical format. Answers to questions are provided if available also in canonical format, and questions without answers are marked as OPEN or highlighted to indicate more that work is needed. The aggregated questions, answers, open questions, and other notes, dialog tips, etc. are aggregated for presentation to the agent 308. The work items may be assigned to one or more agents and/or resources 112, 308, in step 420. The dialog aggregator module 128 may run an additional scan, in step 424, to determine whether or not all issues have been addressed. If the answer is no to the query, a new analysis may be initiated by the dialog aggregator module 128 to identify unresolved issues, in step 428. Once the unresolved issues in step 428 have been identified, the issues may be worked by an agent 308 and/or other resources 112, in step 432. Once the work item has been worked, the work item may be completed and/or closed, in step 436. If the answer is yes to the query in step 424, the method goes to step 436 where the work item may be completed and/or closed. The method 400 for dialog topic aggregation ends, at step 440.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:
    receiving a multi-topic dialog at a processor;

analyzing, by the processor, the multi-topic dialog to identify a plurality of questions contained within the multi-topic dialog, wherein the plurality of questions contained within the multi-topic dialog comprise a plurality of questions on a plurality of topics;

formatting, by the processor, a presentation of the multi-topic dialog in an aggregated display, the presentation including an indication of the identified plurality of questions contained within the multi-topic dialog, wherein the plurality of questions are aggregated from a plurality of different users using different communication types;

determining, by the processor, whether each of the identified plurality of questions has been addressed; and presenting, by the processor, the presentation of the multi-topic dialog, wherein the presentation of the multi-topic dialog includes the identified plurality of questions along with corresponding indications of whether or not the identified plurality of questions have been answered.

2. The method of claim 1, wherein determining whether each question in the identified plurality of questions has been addressed comprises determining, by the processor, that a question from one of a social media interaction, an email interaction, and a chat interaction has been addressed by someone other than a contact center agent; wherein the question from the one of the social media interaction, the email interaction, and the chat interaction is included in the presentation of the multi-topic dialog; and wherein the presentation of the multi-topic dialog is presented to the contact center agent.

3. The method of claim 2, wherein determining whether each question in the identified plurality of questions has been addressed further comprises:

analyzing, by the processor, interactions between a contact center resource and the multi-topic dialog to determine whether the contact center resource has automated answers for at least one of the identified plurality of questions.

4. The method of claim 1, wherein there are answered questions and unanswered questions in the identified plurality of questions, and wherein presenting the presentation of the multi-topic dialog includes displaying an answer provided to each of the answered questions in the identified plurality of questions, and wherein the answer is displayed within the multi-topic dialog adjacent to the respective answered question.

5. The method of claim 1, further comprising:

determining, by the processor, that less than all of the identified plurality of questions have been addressed;
identifying, by the processor, each un-addressed question; and
highlighting, by the processor, each un-addressed question in the presentation of the multi-topic dialog for a contact center agent.

6. The method of claim 5, further comprising:

requiring, by the processor, a contact center resource to address each question in the identified plurality of questions prior to allowing the contact center resource to close a contact center work item associated with the multi-topic dialog.

7. The method of claim 1, wherein the multi-topic dialog comprises interactions between different social media users, email users, and chat users.

8. The method of claim 1, wherein the multi-topic dialog comprises a single message transmitted to a contact center from a single user, wherein the multi-topic dialog includes different questions requiring different types of actions by a contact center agent.

9. A system, comprising:

a microprocessor; and
a computer-readable medium coupled to the microprocessor and comprising instructions causing the microprocessor to:
receive a multi-topic dialog;
analyze the multi-topic dialog to identify a plurality of questions contained within the multi-topic dialog, wherein the plurality of questions contained within the multi-topic dialog comprises a plurality of questions on a plurality of topics;
format a presentation of the multi-topic dialog in an aggregated display, the presentation including an indication of the identified plurality of questions contained within the multi-topic dialog, wherein the plurality of questions are aggregated from a plurality of different users using different communication types;
determine whether each of the identified plurality of questions has been addressed; and
present the presentation of the multi-topic dialog, wherein the presentation of the multi-topic dialog includes the identified plurality of questions along with corresponding indications of whether or not the identified plurality of questions have been answered.

10. The system of claim 9, wherein the determining whether each question in the identified plurality of questions has been addressed comprises:

analyzing, by the microprocessor, each of a social media interaction, an email interaction, and a chat interaction to determine if a question has been addressed by someone other than a contact center agent.

11. The system of claim 10, wherein the determining whether each question in the identified plurality of questions has been addressed further comprises:

analyzing, by the microprocessor, interactions between a contact center resource and the multi-topic dialog to determine whether the contact center resource has addressed the identified plurality of questions in the interactions.

12. The system of claim 9, wherein the presenting the presentation of the multi-topic dialog includes displaying answers adjacent to each question in the identified plurality of questions, and further comprising: screening, by the microprocessor, the answers to determine if each of the answers are correct; and locking, by the microprocessor, the identified plurality of questions that do not have a correct answer.

13. The system of claim 10, further comprising:

after the analyzing the social media interaction, the email interaction, and the chat interaction, determining, by the microprocessor, that less than all questions in the identified plurality of questions have been addressed and that less than all questions in the identified plurality of questions have been answered;
identifying, by the microprocessor, each un-addressed question and each unanswered question;
highlighting, by the microprocessor and using a first type of visual indication, each unanswered question in the presentation of the multi-topic dialog; and
highlighting, by the microprocessor and using a second type of visual indication that is distinct from the first type of visual indication, each un-addressed question in the presentation of the multi-topic dialog for a contact center agent.

14. The system of claim 13, further comprising: automatically analyzing; by the microprocessor, each un-addressed question to determine if each un-addressed question has been addressed; and requiring, by the microprocessor, a contact center resource to address each question in the identified plurality of questions prior to allowing the contact center resource to close a contact center work item associated with the multi-topic dialog.

15. The system of claim 9, wherein the multi-topic dialog comprises interactions between different social media users, email users, and chat users.

16. The system of claim 9, wherein the multi-topic dialog comprises a single message transmitted to a contact center from a single user, wherein the multi-topic dialog includes different questions from the single user requiring action by a contact center agent, wherein the action is input to the multi-topic dialog that addresses the different questions, wherein the microprocessor evaluates the input in real-time to determine if the different questions have been answered, and wherein the microprocessor updates the corresponding indications in the presentation of the multi-topic dialog based on the evaluation.

17. A communication system, comprising:
a server coupled to a communication network and receiving input to process a work event, wherein the server comprises a processor that:
receives a multi-topic dialog;
analyzes the multi-topic dialog to identify a plurality of questions contained within the multi-topic dialog, wherein the plurality of questions contained within the multi-topic dialog comprises a plurality of questions on a plurality of topics;
formats a presentation of the multi-topic dialog, the presentation including an indication of the identified plurality of questions contained within the multi-topic dialog in an aggregated display, wherein the plurality of questions are aggregated from a plurality of different users using different communication types;
determines whether each of the identified plurality of questions has been addressed; and
presents the presentation of the multi-topic dialog, wherein the presentation of the multi-topic dialog includes the identified plurality of questions along with corresponding indications of whether or not the identified plurality of questions have been answered.

18. The system of claim 17, wherein the determining step comprises an analysis of a social media interaction, an email interaction, and a chat interaction by the processor to determine if a question has been addressed by someone other than a contact center agent in a contact center; generating, by a work assignment engine in the contact center, a work item for at least one of the identified plurality of questions that has not been addressed; and sending, by the work assignment engine, the work item to a resource in the contact center.

19. The system of claim 17, wherein the processor:
analyzes interactions between a contact center resource and the multi-topic dialog to determine whether the contact center resource has addressed the identified plurality of questions;
determines that less than all questions in the identified plurality of questions have been addressed;
identifies each un-addressed question;
highlights each un-addressed question in the presentation of the multi-topic dialog for a contact center agent; and
requires a contact center resource to address each question in the identified plurality of questions prior to allowing the contact center resource to close a contact center work item associated with the multi-topic dialog.

20. The system of claim 17, wherein the multi-topic dialog comprises interactions between at least two different social media users, email users, and chat users, wherein the identified plurality of questions originate from the at least two different social media users, email users, and chat users, wherein the multi-topic dialog comprises a single message transmitted to a contact center from a single user, and wherein the multi-topic dialog includes different questions requiring action by a contact center agent for the at least two different social media users, email users, and chat users.

* * * * *